US012033670B2

(12) United States Patent
Oh et al.

(10) Patent No.: US 12,033,670 B2
(45) Date of Patent: Jul. 9, 2024

(54) EDITING PORTRAIT VIDEOS

(71) Applicant: ADOBE INC., San Jose, CA (US)

(72) Inventors: Seoungwug Oh, San Jose, CA (US);
Joon-Young Lee, San Jose, CA (US);
Jingwan Lu, Sunnyvale, CA (US);
Kwanggyoon Seo, Seoul (KR)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/810,651

(22) Filed: Jul. 5, 2022

(65) Prior Publication Data
US 2024/0013809 A1 Jan. 11, 2024

(51) Int. Cl.
| G11B 27/036 | (2006.01) |
| G06T 7/30 | (2017.01) |
| G06T 11/60 | (2006.01) |
| G06V 10/776 | (2022.01) |
| G06V 20/40 | (2022.01) |
| G06V 40/16 | (2022.01) |

(52) U.S. Cl.
CPC ............. *G11B 27/036* (2013.01); *G06T 7/30* (2017.01); *G06T 11/60* (2013.01); *G06V 10/776* (2022.01); *G06V 20/46* (2022.01); *G06V 40/171* (2022.01); *G06V 40/176* (2022.01); *G06T 2207/10016* (2013.01); *G06T 2207/20212* (2013.01); *G06T 2207/30201* (2013.01); *G06T 2210/22* (2013.01)

(58) Field of Classification Search
CPC . G06T 7/30; G06T 11/60; G06T 2207/10016; G06T 2207/20212; G06T 2207/30201; G06T 2210/22; G06V 40/171; G06V 20/46; G06V 40/176; G06V 10/776

USPC .......................................................... 386/278
See application file for complete search history.

(56) References Cited

U.S. PATENT DOCUMENTS

2019/0295302 A1* 9/2019 Fu ........................... G06V 10/82
2021/0042503 A1* 2/2021 Karras ...................... G06T 7/70
(Continued)

OTHER PUBLICATIONS

Härkönen, et al., "GANSpace: Discovering Interpretable GAN Controls", In 34th Conference on Neural Information Processing Systems (NeurIPS 2020), 10 pages.

(Continued)

*Primary Examiner* — Thai Q Tran
*Assistant Examiner* — Nienru Yang
(74) *Attorney, Agent, or Firm* — F. CHAU & ASSOCIATES, LLC

(57) ABSTRACT

Systems and methods for video processing are described. Embodiments of the present disclosure identify an image that depicts an expression of a face; encode the image to obtain a latent code representing the image; edit the latent code to obtain an edited latent code that represents the face with a target attribute that is different from an original attribute of the face and with an edited expression that is different from the expression of the face; modify the edited latent code to obtain a modified latent code that represents the face with the target attribute and a modified expression, wherein a difference between the expression and the modified expression is less than a difference between the expression and the edited expression; and generate a modified image based on the modified latent code, wherein the modified image depicts the face with the target attribute and the modified expression.

20 Claims, 12 Drawing Sheets

(56) References Cited

U.S. PATENT DOCUMENTS

| | | | | |
|---|---|---|---|---|
| 2021/0173916 | A1* | 6/2021 | Ortiz | G06V 10/764 |
| 2021/0358177 | A1* | 11/2021 | Park | G06N 3/08 |
| 2022/0028139 | A1* | 1/2022 | Mitra | G06V 40/175 |
| 2022/0157014 | A1* | 5/2022 | Sevastopolskiy | G06T 15/60 |
| 2022/0172416 | A1* | 6/2022 | Kuta | G06T 11/60 |

OTHER PUBLICATIONS

Karras, et al., "Alias-Free Generative Adversarial Networks", 35th Conference on Neural Information Processing Systems, preprint arXiv:2106.12423v4 [cs.CV] Oct. 18, 2021, 31 pages.

Karras, et al., "A Style-Based Generator Architecture for Generative Adversarial Networks", In IEEE/CVF Conference on Computer Vision and Pattern Recognition, 2019, pp. 4401-4410.

Karras, et al., "Analyzing and Improving the Image Quality of StyleGAN", In IEEE/CVF Conference on Computer Vision and Pattern Recognition, 2020, pp. 8110-8119.

Roich, et al., "Pivotal Tuning for Latent-based Editing of Real Images", arXiv preprint arXiv:2106.05744v1 [cs.CV] Jun. 10, 2021, 26 pages.

Shen, et al., "Interpreting the Latent Space of GANs for Semantic Face Editing", In IEEE/CVF Conference on Computer Vision and Pattern Recognition, 2020, pp. 9243-9252.

Tov, et al., "Designing an encoder for stylegan image manipulation", ACM Transactions on Graphics, 40(4):1-14, arXiv preprint arXiv:2102.02766v1 [cs.CV] Feb. 4, 2021.

Yang, et al., "One-Shot Domain Adaptation for Face Generation", In IEEE/CVF Conference on Computer Vision and Pattern Recognition, arXiv preprint arXiv:2003.12869v1 [cs.CV] Mar. 28, 2020, 10 pages.

Yao, et al., "A Latent Transformer for Disentangled Face Editing in Images and Videos", In IEEE/CVF International Conference on Computer Vision, arXiv preprint arXiv:2106.11895v2 [cs.CV] Aug. 17, 2021, 15 pages.

* cited by examiner

EDITING PORTRAIT VIDEOS

BACKGROUND

The following relates generally to video processing using machine learning. Video processing refers to the use of a computer to edit a set of frames or analyze a video file using an algorithm or a processing network. In some examples, a machine learning model takes an input video and an editing command and generates an edited video based on the editing command.

Some video processing systems have applied artificial neural networks for editing videos. However, conventional video processing systems do not produce natural-looking edits. For example, editing certain facial attributes may lead to unwanted changes to the identity and expression of a face (e.g., distorted mouth motion). Therefore, there is a need in the art for an improved video processing system that can modify videos without undesirable artifacts such as changes in facial expressions.

SUMMARY

The present disclosure describes systems and methods for video processing. Embodiments of the present disclosure include a video processing apparatus configured to receive an editing input and modify a video comprising a sequence of frames based on the editing input to obtain a modified video. The video processing apparatus can generate images of a face that has a desired facial attribute while preserving other details of the original face. According to an embodiment, an image is embedded in a latent space, edited to have the desired attribute (e.g., add or increase smile), and then the edited latent code is modified to reduce deviation from the original (especially in areas such as lips or eyes). This way, the modified images generated from the video processing apparatus preserve the expression dynamics in the original video while maintaining identity and facial emotion of the face after editing an attribute.

A method, apparatus, and non-transitory computer readable medium for video processing are described. One or more embodiments of the method, apparatus, and non-transitory computer readable medium include identifying an image that depicts an expression of a face; encoding the image to obtain a latent code representing the image; editing the latent code to obtain an edited latent code that represents the face with a target attribute that is different from an original attribute of the face and with an edited expression that is different from the expression of the face; modifying the edited latent code to obtain a modified latent code that represents the face with the target attribute and a modified expression, wherein a difference between the expression and the modified expression is less than a difference between the expression and the edited expression; and generating a modified image based on the modified latent code, wherein the modified image depicts the face with the target attribute and the modified expression.

A method, apparatus, and non-transitory computer readable medium for video processing are described. One or more embodiments of the method, apparatus, and non-transitory computer readable medium include training an image generator to generate facial images based on input from a latent space; encoding an image depicting an expression of a face to obtain a latent code representing the image in the latent space; generating a reconstructed image based on the latent code using the image generator; updating parameters of the image generator based on the reconstructed image to obtain an adapted image generator; editing the latent code to obtain an edited latent code that represents the face with a target attribute that is different from an original attribute of the face and with an edited expression that is different from the expression of the face; modifying the edited latent code to obtain a modified latent code that represents the face with the target attribute and a modified expression, wherein a difference between the expression and the modified expression is less than a difference between the expression and the edited expression; and generating a modified image based on the modified latent code using the adapted image generator, wherein the modified image depicts the face with the target attribute and the modified expression.

An apparatus and method for video processing are described. One or more embodiments of the apparatus and method include an image encoder configured to encode an image depicting an expression of a face to obtain a latent code representing the image; an image editing component configured to edit the latent code to obtain an edited latent code that represents the face with a target attribute that is different from an original attribute of the face and with an edited expression that is different from the expression of the face; an expression dynamics optimization component configured to modify the edited latent code to obtain a modified latent code that represents the face with the target attribute and a modified expression, wherein a difference between the expression and the modified expression is less than a difference between the expression and the edited expression; and an image generator configured to generate a modified image based on the modified latent code, wherein the modified image depicts the face with the target attribute and the modified expression.

DETAILED DESCRIPTION

Figure 1:
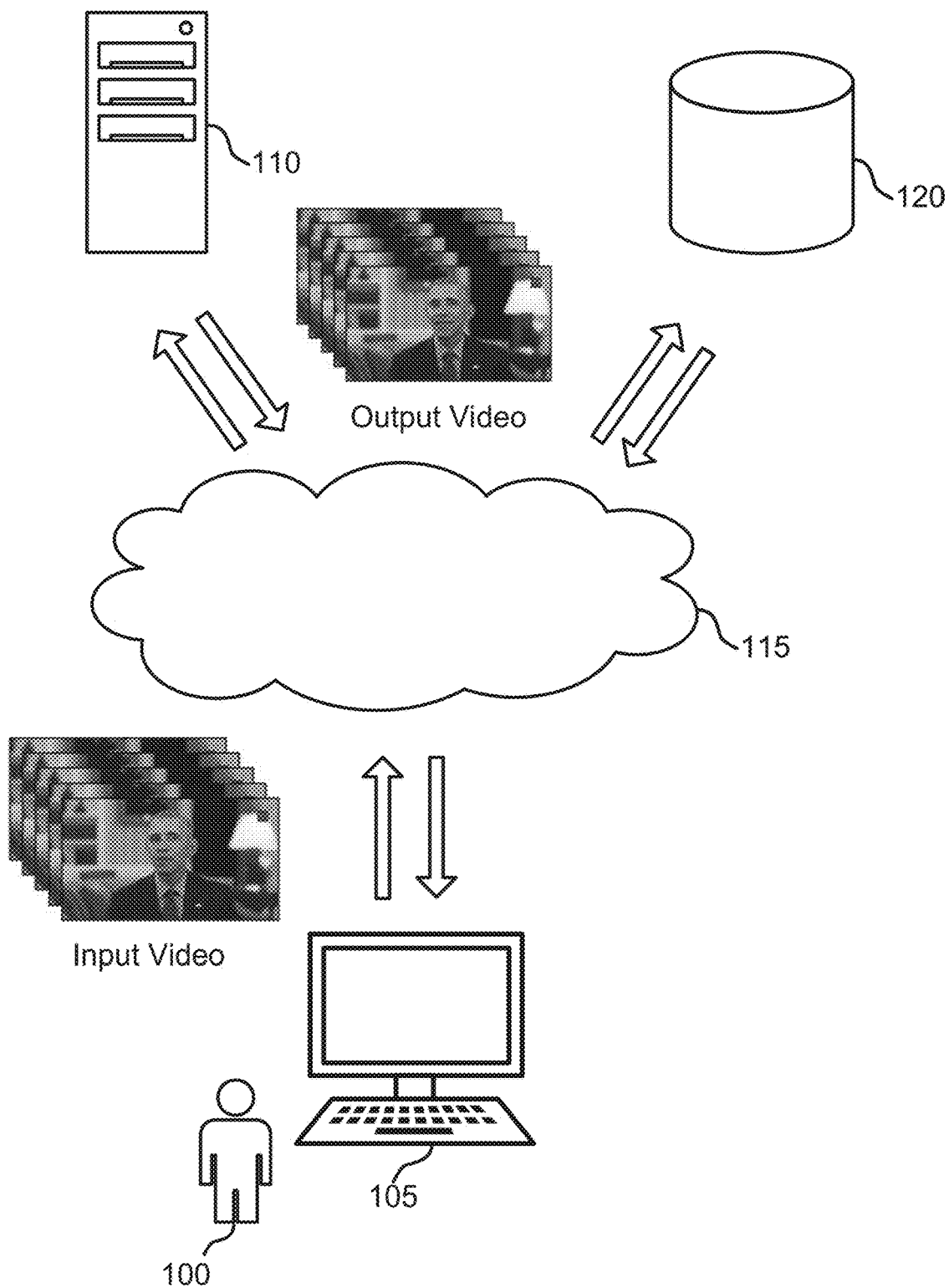
FIG. 1 shows an example of a video processing system according to aspects of the present disclosure.

The present disclosure describes systems and methods for video processing. Embodiments of the present disclosure include a video processing apparatus configured to receive an editing command and modify a video comprising a sequence of frames based on the editing command to obtain a modified video comprising desired images. The video processing apparatus can generate images of a face that has a desired attribute while retaining properties of the original face in the input video. According to an embodiment, an image is embedded in a latent space, edited to have the desired attribute (e.g., increase or add smile), and then the edited latent code is modified to reduce deviation from the original (especially in areas such as lips or eyes). This way, the modified images generated by the video processing apparatus preserve the expression dynamics in the original video while maintaining identity and facial emotion of the face after editing an attribute.

Recently, machine learning models such as generative adversarial network (GAN) have been used to generate high-resolution photo-realistic images. Video editing systems may apply a GAN inversion method, project images onto the latent space of a pre-trained unconditional GAN for image editing. For example, such systems may project an input image to the latent space of a pre-trained StyleGAN and modify its high-level facial attributes by navigating the StyleGAN's latent space.

However, in video editing, conventional systems often cause issues such as low temporal consistency across frames (i.e., causing temporal artifacts). Furthermore, conventional video editing systems do not preserve identity and expression after editing facial attributes. For example, some input videos include naturally occurring motion blur caused by moving cameras and subjects. Because conventional systems fail to properly handle and preserve motion blur, a generated video may look unnatural or unrealistic. Additionally, conventional systems do not consider natural expression dynamics, and modified images from such systems sharply deviate from the original images, thereby creating undesired visual effects.

Embodiments of the present disclosure include a video processing apparatus configured to receive an editing input and an input video, where the input video is edited and optimized based on the editing input to obtain a modified video. The present disclosure relates to generating images of a face that has a desired attribute (e.g., add a smile) while retaining properties of the original video. An image from the original video is embedded in a latent space, edited to have the desired attribute (e.g., a smile), and then the edited latent code is modified, via an expression dynamics optimization component, to reduce or eliminate deviation from the original (especially in areas such as lips or eyes).

In some embodiments, the video processing apparatus edits the latent code based on the editing input to obtain an edited latent code. The video processing apparatus modifies the edited latent code to obtain a modified latent code that represents the face with the target attribute and a modified expression. The difference between the expression and the modified expression is less than a difference between the expression and the edited expression. The video processing apparatus generates a modified image based on the modified latent code.

According to at least one embodiment of the present disclosure, the video generation apparatus is configured to adapt the pre-trained StyleGAN weights to the characteristics of the input video (i.e., target video). Video frames are projected onto the latent space of StyleGAN. StyleGAN generator is further fine-tuned using self-supervised reconstruction losses to adapt the generator to the input video. After video adaptation, the image generator can reproduce the identity, poses, expressions, and even motion blur in the input video. This way, the video generation apparatus can generate temporally consistent video outputs.

According to some embodiments of the present disclosure, the video processing apparatus uses expression dynamics optimization to modify the edited latent codes to maintain meaningful facial motion after editing. Expression dynamics optimization procedure correlates facial emotion with the shape of the mouth and eyes. That is, the video processing apparatus is configured to regulate the movement of lips and the appearance of eyes to preserve the expression dynamics in the original video while maintaining the facial emotion after editing a facial attribute. In some examples, expression dynamics optimization can be applied to edit a talking head video, and the video processing apparatus effectively reverses undesirable changes in the facial expression (e.g., mouth wide open when adding smile).

Embodiments of the present disclosure may be used in the context of video processing applications. For example, a video processing network based on the present disclosure may take an editing command and a video and efficiently generate a modified video based on the editing command for subsequent user manipulation. Details regarding the architecture of an example video processing apparatus are provided with reference to FIGS. 1-3. An example application, according to some embodiments, is provided with reference to FIG. 4. Example processes for video processing are provided with reference to FIGS. 5-8. Example training processes are described with reference to FIGS. 9-12.

Network Architecture

Figure 2:
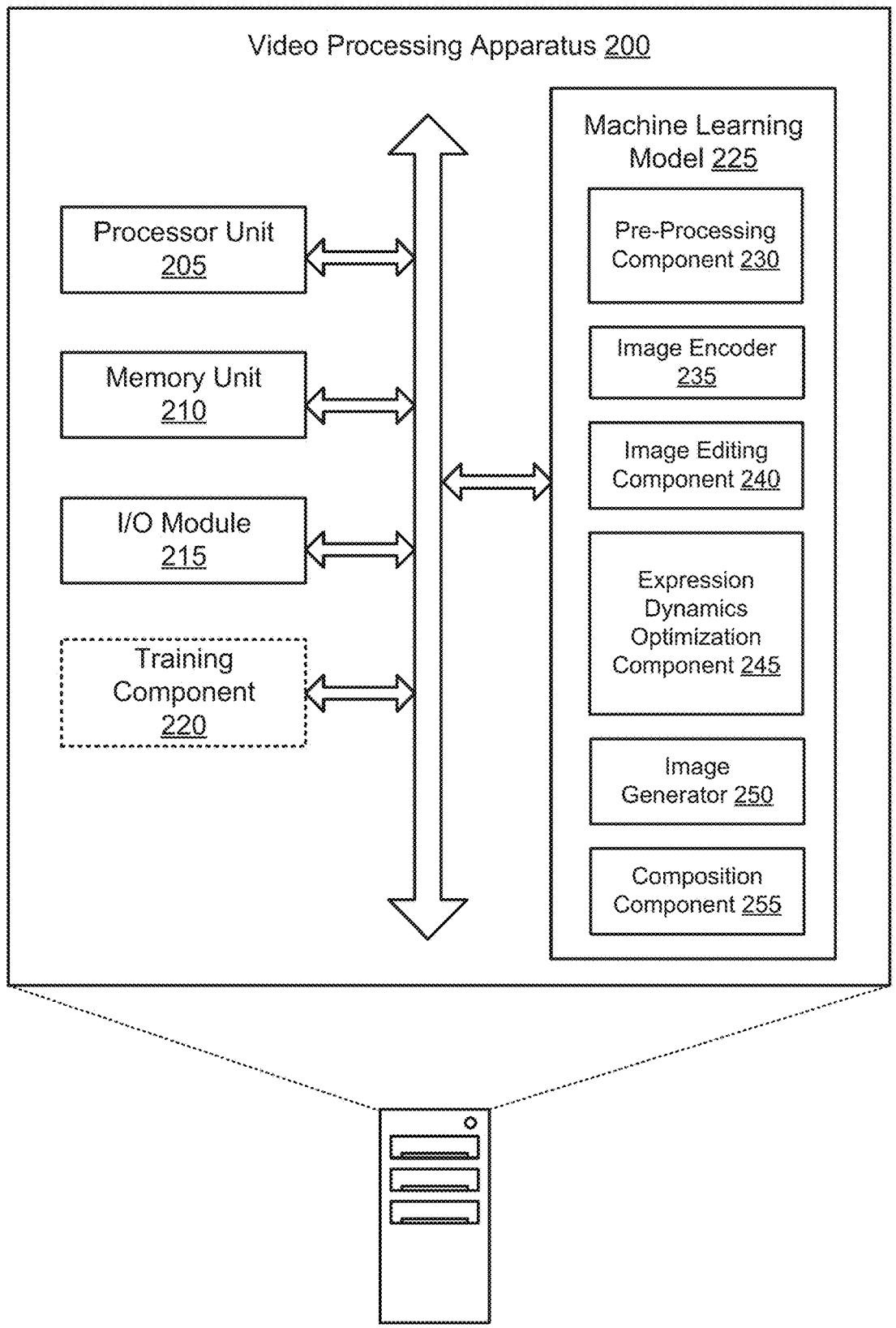
FIG. 2 shows an example of a video processing apparatus according to aspects of the present disclosure.
Figure 3:
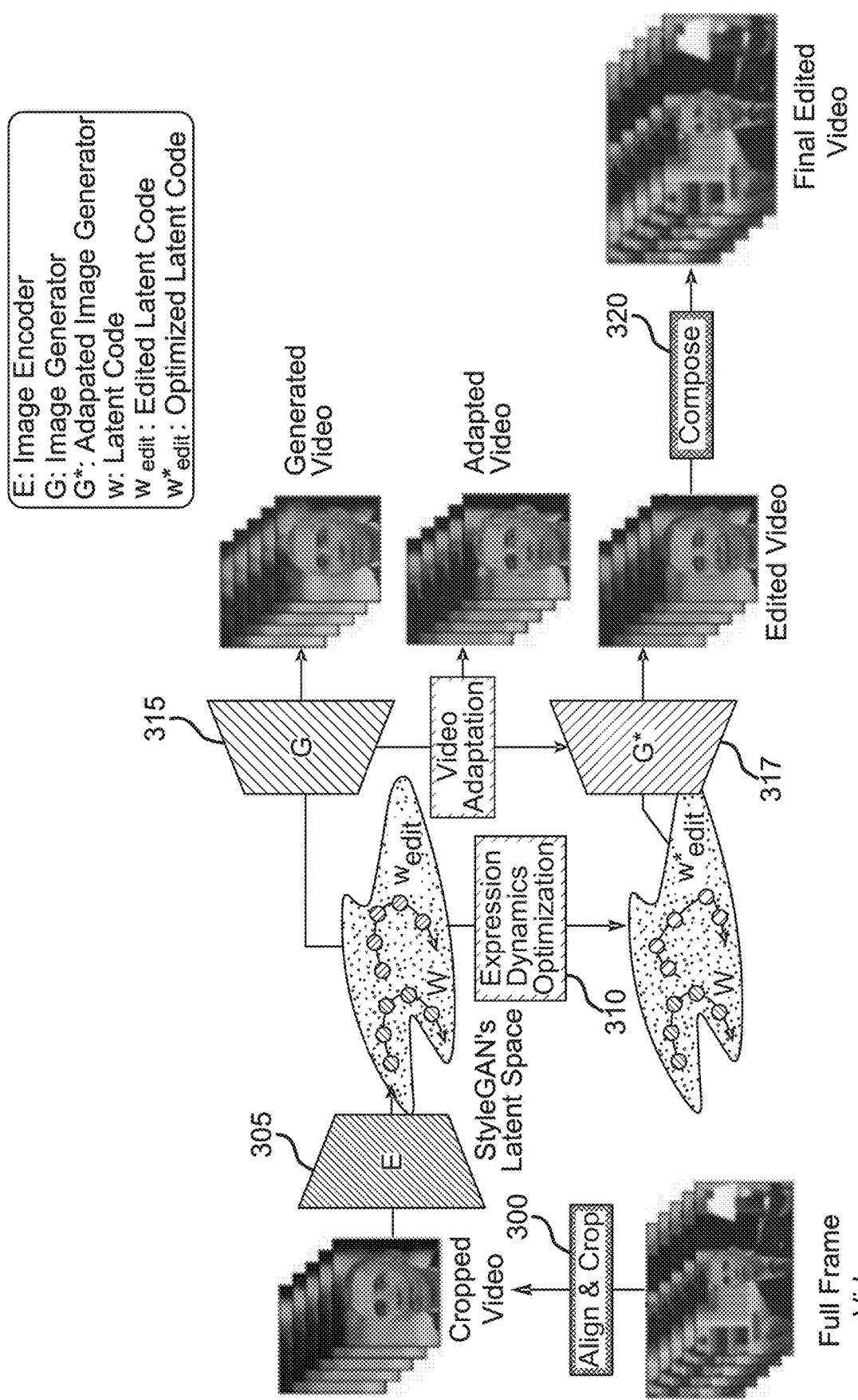
FIG. 3 shows an example of a machine learning model according to aspects of the present disclosure.

In FIGS. 1-3, an apparatus and method for video processing are described. One or more embodiments of the apparatus and method include an image encoder configured to encode an image depicting an expression of a face to obtain a latent code representing the image; an image editing component configured to edit the latent code to obtain an edited latent code that represents the face with a target attribute that is different from an original attribute of the face and with an edited expression that is different from the expression of the face; an expression dynamics optimization component configured to modify the edited latent code to obtain a modified latent code that represents the face with the target attribute and a modified expression, wherein a difference between the expression and the modified expression is less than a difference between the expression and the edited expression; and an image generator configured to generate a modified image based on the modified latent code, wherein the modified image depicts the face with the target attribute and the modified expression.

Some examples of the apparatus and method further include a pre-processing component configured to extract frames of a video and crop the extracted frames to obtain cropped frames depicting the face.

Some examples of the apparatus and method further include a composition component configured to combine the modified image with an original extended image to obtain a modified extended image, and to compose a plurality of modified extended images to obtain a modified video.

FIG. 1 shows an example of a video processing system according to aspects of the present disclosure. The example shown includes user 100, user device 105, video processing apparatus 110, cloud 115, and database 120. Video processing apparatus 110 is an example of, or includes aspects of, the corresponding element described with reference to FIG. 2.

As an example shown in FIG. 1, user 100 uploads an input video via user device 105. The input video is transmitted to video processing apparatus 110, e.g., via cloud 115. Video processing apparatus 110 identifies an image from the video, where the image depicts an expression of a face. Video processing apparatus 110 encodes the image to obtain a latent code representing the image.

In some examples, user 100 desires to increase an expression of a smile on the face from the input video. Video processing apparatus 110 edits the latent code to obtain an edited latent code that represents the face with a target attribute that is different from an original attribute of the face and with an edited expression that is different from the expression of the face.

Video processing apparatus 110 modifies the edited latent code to obtain a modified latent code that represents the face with the target attribute and a modified expression. The difference between the expression and the modified expression is less than a difference between the expression and the edited expression. In some examples, when changing the smile attribute, the mouth may be open to a larger degree. With expression dynamics optimization, the mouth is relatively less open. Video processing apparatus 110 generates a modified image based on the modified latent code. The modified image depicts the face with the target attribute and the modified expression. Video processing apparatus 110 composes an output video comprising the modified image and transmits the output video to user 100 via cloud 115 and user device 105. The process of using video processing apparatus 110 is further described with reference to FIG. 4.

User device 105 may be a personal computer, laptop computer, mainframe computer, palmtop computer, personal assistant, mobile device, or any other suitable processing apparatus. In some examples, user device 105 includes software that incorporates a video processing application (e.g., a video editing application). In some examples, the video editing application on user device 105 may include functions of video processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Video processing apparatus 110 includes a computer implemented network comprising a pre-processing component, an image encoder, an image editing component, an expression dynamics optimization component, an image generator, and a composition component.

Video processing apparatus 110 may also include a processor unit, a memory unit, an I/O module, and a training component. The training component is used to train a machine learning model (or a video processing network). Additionally, video processing apparatus 110 can communicate with database 120 via cloud 115. In some cases, the architecture of the video processing network is also referred to as a network or a network model. Further detail regarding the architecture of video processing apparatus 110 is provided with reference to FIGS. 2-3. Further detail regarding the operation of video processing apparatus 110 is provided with reference to FIGS. 4-8.

In some cases, video processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, the database controller may operate automatically without user interaction.

FIG. 2 shows an example of a video processing apparatus according to aspects of the present disclosure. The example shown includes video processing apparatus 200, processor unit 205, memory unit 210, I/O module 215, training component 220, and machine learning model 225. Video processing apparatus 200 is an example of, or includes aspects of, the corresponding element described with reference to FIG. 1. In some embodiments, machine learning model 225 includes pre-processing component 230, image encoder 235, image editing component 240, expression dynamics optimization component 245, image generator 250, and composition component 255.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, video processing apparatus 200 includes a computer implemented artificial neural network (ANN) for generating a modified video comprising at least one modified image based on a modified latent code. An ANN is a hardware or a software component that includes a number of connected nodes (i.e., artificial neurons), which loosely correspond to the neurons in a human brain. Each connection, or edge, transmits a signal from one node to another (similar to the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, video processing apparatus 200 includes a convolutional neural network (CNN) for processing an input video comprising a set of frames. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 computes a perceptual loss between the reconstructed image and the image. In some examples, training component 220 updates parameters of image generator 250 based on the perceptual loss, where the modified image is generated using the updated parameters of the image generator 250. In some examples, training component 220 computes a distance loss between the reconstructed image and the image. Training component 220 updates parameters of image generator 250 based on the distance loss, where the modified image is generated using the updated parameters of the image generator 250.

In some examples, training component 220 computes a landmark loss based on the facial landmark and the edited facial landmark, where the landmark loss corresponds to the element of the face. Training component 220 updates the edited latent code based on the landmark loss to obtain the modified latent code. In some examples, training component 220 computes a mask perceptual loss based on the edited image and the mask, where the edited latent code is updated based on the mask perceptual loss. In some examples, training component 220 computes a regularization loss based on the edited latent code and the modified latent code, where the edited latent code is modified based on the regularization loss. In some examples, training component 220 computes a temporal loss based on the modified latent code and the additional modified latent code, where the edited latent code is modified based on the temporal loss.

According to some embodiments, training component 220 trains image generator 250 to generate facial images based on input from a latent space. In some examples, training component 220 updates parameters of image generator 250 based on the reconstructed image to obtain an adapted image generator. In some examples, training component 220 computes a perceptual loss between the reconstructed image and the image, where the parameters of image generator 250 are updated based on the perceptual loss. In some examples, training component 220 computes a distance loss between the reconstructed image and the image, where the parameters of image generator 250 are updated based on the distance loss. In some examples, training component 220 is part of another apparatus other than video processing apparatus 200.

According to some embodiments, pre-processing component 230 identifies an image that depicts an expression of a face. In some examples, pre-processing component 230 extracts a set of frames from a video that depicts changing the expression of the face, where the image corresponds to a frame of the set of frames. In some examples, pre-processing component 230 receives an extended image depicting the face and one or more additional elements. Pre-processing component 230 crops the extended image to obtain the image. In some examples, pre-processing component 230 identifies an additional image, where the image and the additional image are from a same video.

According to some embodiments, pre-processing component 230 is configured to extract frames of a video and crop the extracted frames to obtain cropped frames depicting the face. Pre-processing component 230 is an example of, or includes aspects of, the corresponding element described with reference to FIG. 3.

According to some embodiments, image encoder 235 encodes the image to obtain a latent code representing the image. According to some aspects, image encoder 235 encodes an image depicting an expression of a face to obtain a latent code representing the image in the latent space. Image encoder 235 is an example of, or includes aspects of, the corresponding element described with reference to FIGS. 3 and 10.

According to some embodiments, image editing component 240 edits the latent code to obtain an edited latent code that represents the face with a target attribute that is different from an original attribute of the face and with an edited expression that is different from the expression of the face. In some examples, image editing component 240 receives an editing input from a user. In some examples, image editing component 240 receives an editing command that includes one or more editing inputs from the user. Image editing component 240 identifies the target attribute based on the editing input. In some examples, image editing component 240 provides a set of attribute sliders in a graphical user interface (GUI), where the set of attribute sliders corresponds to a set of attributes of the face, and where the editing input includes a change to one of the set of attribute sliders.

According to some embodiments, image editing component 240 edits the latent code to obtain an edited latent code that represents the face with a target attribute that is different from an original attribute of the face and with an edited expression that is different from the expression of the face.

According to some embodiments, expression dynamics optimization component 245 modifies the edited latent code to obtain a modified latent code that represents the face with the target attribute and a modified expression, where a difference between the expression and the modified expression is less than a difference between the expression and the edited expression. In some examples, expression dynamics optimization component 245 identifies a facial landmark of the image corresponding to an element of the face. Expression dynamics optimization component 245 identifies an edited facial landmark based on the edited image, where the edited facial landmark corresponds to the element of the face. In some examples, the element of the face includes a lip. In some examples, expression dynamics optimization component 245 generates a mask corresponding to an element of the face. In some examples, a mask is a binary image that is used to segment an image. The mask represents an output of prediction from a neural network, which is trained to predict pixel-wise classes for an input image. In some examples, the element of the face includes an eye. In some examples, expression dynamics optimization component 245 generates an additional modified latent code based on the additional image.

According to some embodiments, expression dynamics optimization component 245 modifies the edited latent code to obtain a modified latent code that represents the face with the target attribute and a modified expression, where a difference between the expression and the modified expression is less than a difference between the expression and the edited expression. Expression dynamics optimization component 245 is an example of, or includes aspects of, the corresponding element described with reference to FIG. 3.

According to some embodiments, image generator 250 generates a modified image based on the modified latent code, where the modified image depicts the face with the target attribute and the modified expression. In some examples, image generator 250 generates a reconstructed image based on the latent code. In some examples, image generator 250 generates an edited image based on the edited latent code.

According to some embodiments, image generator 250 generates a modified image based on the modified latent code using the adapted image generator, where the modified image depicts the face with the target attribute and the modified expression. Image generator 250 is an example of, or includes aspects of, the corresponding element described with reference to FIGS. 3, 10, and 11.

According to some embodiments, composition component 255 combines the modified image with a set of modified frames corresponding to other frames of the set of frames to obtain a modified video that depicts the face with the target attribute. In some examples, composition component 255 aligns the modified image with the extended image. Composition component 255 combines the modified image with the extended image based on the alignment to obtain a modified extended image.

According to some embodiments, composition component 255 is configured to combine the modified image with an original extended image to obtain a modified extended image, and to compose a plurality of modified extended images to obtain a modified video. Composition component 255 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a machine learning model according to aspects of the present disclosure. The example shown includes pre-processing component 300, image encoder 305, expression dynamics optimization component 310, image generator 315, adapted image generator 317, and composition component 320. In some cases, image encoder 305 is denoted as E. Image generator 315 is denoted as G. Adapted image generator 317 is denoted as G*. Latent code is denoted as W. Edited latent code is denoted as $W_{edit}$. Optimized latent code is denoted as $W_{edit}^*$.

According to an embodiment, a full frame video comprising a sequence of frames is input to pre-processing component 300 to generate cropped video. The frames of the video are projected into $\mathcal{W}^+$ space to edit the video (e.g., portrait video) using a generative adversarial network (e.g., StyleGAN). Given a video, $V=\{I^f|f=1, \ldots, N\}$, where N denotes a total number of frames, $I^f$ is inverted into a latent code $w^f$ in $\mathcal{W}^+$ space using image encoder 305 (e.g., encoder4editing or e4e). The e4e encoder is used to complement image manipulation techniques performed over StyleGAN's latent space. Image encoder 305 is pre-trained. A reconstructed video $\hat{V}=\{\hat{I}^f|f=1, \ldots, N\}$ is generated after projection, where $\hat{I}^f=G(w^f; \theta)$ is a generated image from image generator 315. Image generator 315 is a StyleGAN generator denoted as G, where network parameters of G are denoted as θ. Pre-processing component 300 is an example of, or includes aspects of, the corresponding element described with reference to FIG. 2. Image encoder 305 is an example of, or includes aspects of, the corresponding element described with reference to FIGS. 2 and 10.

Machine learning model 225 edits the video after the video is projected onto the latent space and image generator 315 is adapted to the input video. That is, parameters of image generator 315 are updated to obtain adapted image generator 317. Given a known latent direction $\Delta w_{attr}$, for a face attribute, machine learning model 225 is configured to edit a video frame I as follows:

$$I_{edit}=G(w_{edit};\theta^*) \quad (1)$$

where $w_{edit}=w+s\Delta w_{attr}$ and s denotes a scalar value. For simplicity, the frame index is omitted herein unless noted otherwise.

The same operation is applied to the frames of the input video to obtain an edited video $V_{edit}$. The machine learning model outputs temporally smooth edited results when editing texture styles such as adding or removing makeups, aging, and de-aging. However, the expression dynamics of $V_{edit}$ may become unnatural when the expression state of the original video varies. The machine learning model described herein takes expression dynamics into account.

According to an embodiment, a full frame video is input to pre-processing component 300, which aligns and crops the full frame video using an alignment method from Flickr-Faces-HQ (FFHQ) dataset. FFHQ is a high-quality image dataset of human faces, originally created as a benchmark for GAN. Image encoder 305 takes the cropped video and projects the cropped frames into the latent space of StyleGAN. Image encoder 305 is pre-trained. The StyleGAN is fine-tuned using the latent codes and the corresponding original frames to reproduce the identity of a human subject in the video. Machine learning model 225, via image editing component 240 as shown in FIG. 2, edits the video in the latent space following a known latent direction (i.e., to modify an attribute of a face such as add smile, happiness). Next, expression dynamics optimization component 310 is configured to optimize the edited latent codes $w_{edit}$ to follow the natural expression dynamics of the original video while preserving the semantic changes. The output from expression dynamics optimization component 310 is optimized latent code $w_{edit}^*$. In some cases, the optimized latent code may also be referred to as a modified latent code. The edited and rendered frames are composed back to the original full-frame video.

Expression dynamics optimization component 310 is an example of, or includes aspects of, the corresponding element described with reference to FIG. 2. Image generator 315 is an example of, or includes aspects of, the corresponding element described with reference to FIGS. 2, 10, and 11. Composition component 320 is an example of, or includes aspects of, the corresponding element described with reference to FIG. 2.

Video Editing

In FIGS. 4-10, a method, apparatus, and non-transitory computer readable medium for video processing are described. One or more embodiments of the method, apparatus, and non-transitory computer readable medium include identifying an image that depicts an expression of a face; encoding the image to obtain a latent code representing the image; editing the latent code to obtain an edited latent code that represents the face with a target attribute that is different from an original attribute of the face and with an edited expression that is different from the expression of the face; modifying the edited latent code to obtain a modified latent code that represents the face with the target attribute and a modified expression, wherein a difference between the expression and the modified expression is less than a difference between the expression and the edited expression; and generating a modified image based on the modified latent code, wherein the modified image depicts the face with the target attribute and the modified expression.

Some examples of the method, apparatus, and non-transitory computer readable medium further include extracting a plurality of frames from a video that depicts changing the expression of the face, wherein the image corresponds to a frame of the plurality of frames. Some examples further include combining the modified image with a plurality of modified frames corresponding to other frames of the plurality of frames to obtain a modified video that depicts the face with the target attribute.

Some examples of the method, apparatus, and non-transitory computer readable medium further include receiving an extended image depicting the face and one or more additional elements. Some examples further include cropping the extended image to obtain the image.

Some examples of the method, apparatus, and non-transitory computer readable medium further include aligning the modified image with the extended image. Some examples further include combining the modified image with the extended image based on the alignment to obtain a modified extended image.

Some examples of the method, apparatus, and non-transitory computer readable medium further include receiving an editing input from a user. Some examples further include identifying the target attribute based on the editing input.

Some examples of the method, apparatus, and non-transitory computer readable medium further include providing a plurality of attribute sliders in a graphical user interface (GUI), wherein the plurality of attribute sliders corresponds to a plurality of attributes of the face, and wherein the editing input comprises a change to one of the plurality of attribute sliders.

Figure 4:
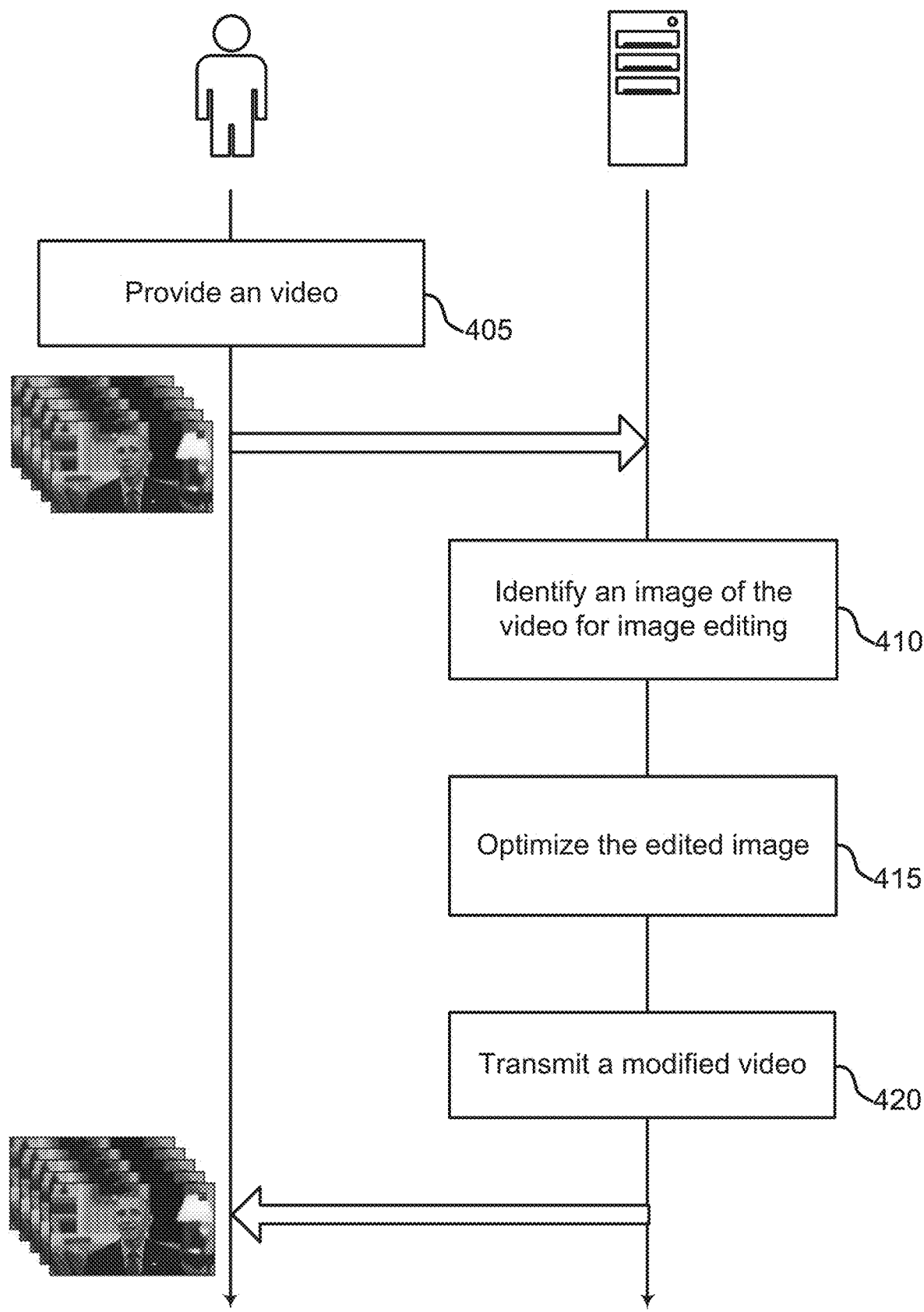
FIG. 4 shows an example of video processing according to aspects of the present disclosure.

FIG. 4 shows an example of video processing according to aspects of the present disclosure. In some examples, these operations are performed by a system including a processor executing a set of codes to control functional elements of an apparatus (i.e., video processing apparatus 200 as shown in FIG. 2). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides a video. In some cases, the operations of this step refer to, or may be performed by, a user via user device 105 as described with reference to FIG. 1.

At operation 410, the system identifies an image of the video for image editing to obtain an edited image. In some cases, the operations of this step refer to, or may be performed by, a video processing apparatus as described with reference to FIGS. 1 and 2. According to an embodiment, video processing apparatus 200 is configured to edit a person's face attribute in a video (e.g., portrait video) while preserving other details in a temporally coherent manner. In some examples, the user changes a person's facial attributes, via an image editing component, to increase age or decrease age, to add or remove makeup, and to exaggerate or suppress facial expressions.

At operation 415, the system optimizes the edited image to obtain a modified image. In some cases, the operations of this step refer to, or may be performed by, a video processing apparatus as described with reference to FIGS. 1 and 2. In some cases, a video may include unusual poses, expressions, and motion blur. With expression dynamics optimization, video processing apparatus 200 is configured to constrain the movement of lips and the appearance of eyes to preserve the expression dynamics in the original video while maintaining the facial emotion after editing (e.g., increase anger expression, increase smile expression).

At operation 420, the system transmits a modified video comprising the modified image to the user. In some cases, the operations of this step refer to, or may be performed by, a video processing apparatus as described with reference to FIGS. 1 and 2. Video processing apparatus 200 produces temporally coherent and natural-looking videos.

Figure 5:
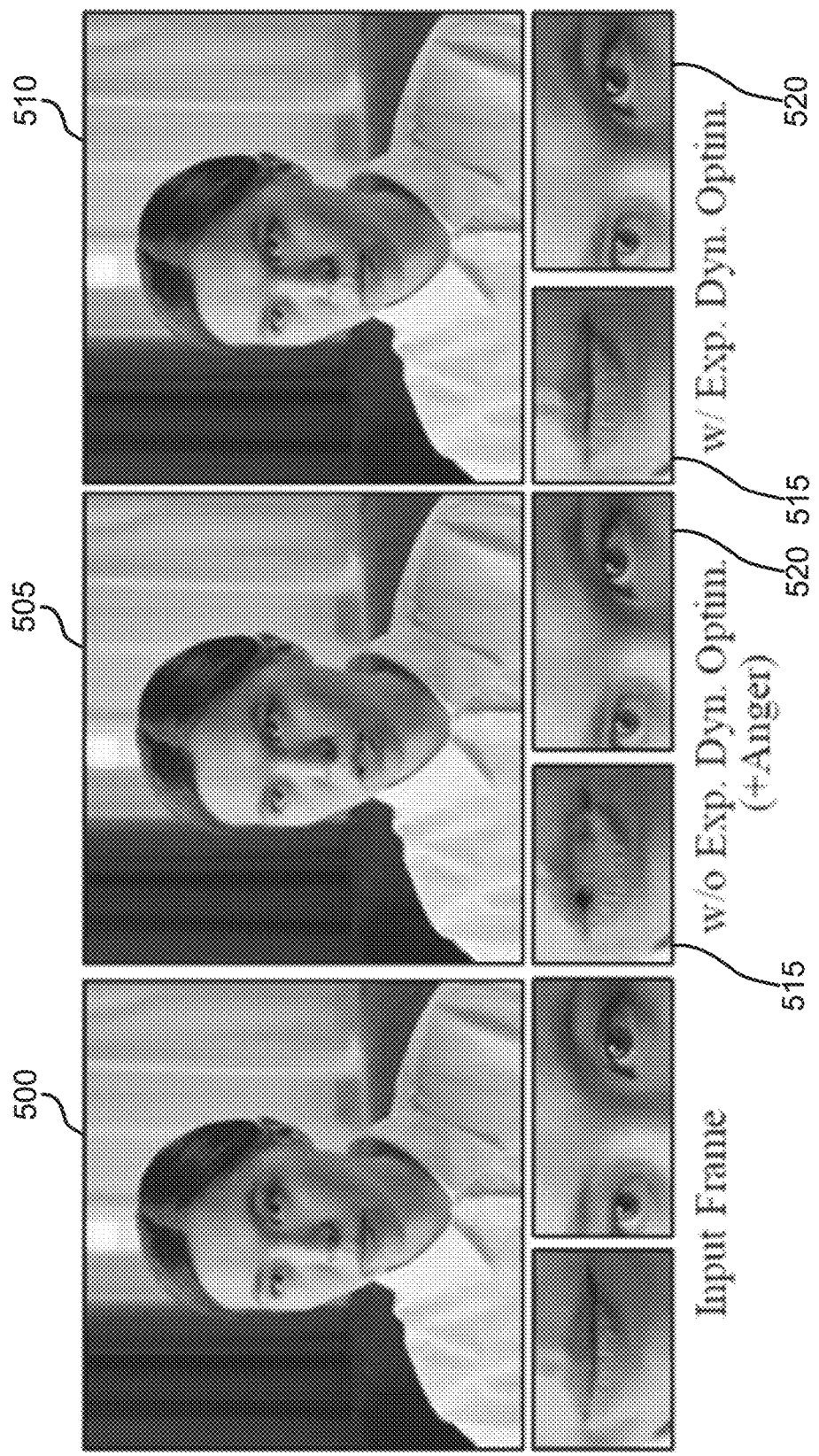
FIG. 5 shows an example of an expression dynamics optimization procedure according to aspects of the present disclosure.

FIG. 5 shows an example of an expression dynamics optimization procedure according to aspects of the present disclosure. The expression dynamics optimization procedure can be performed or executed using the video processing apparatus as shown in FIGS. 1 and 2. The example shown includes input frame 500, edited frame 505, modified frame 510, lip 515, and eye 520. Input frame 500 is an example of, or includes aspects of, the corresponding element described with reference to FIG. 12. In some cases, input frame 500, edited frame 505, modified frame 510 may be referred to as input image, edited image, and modified image, respectively.

According to an embodiment, a portrait video is edited by changing an attribute (e.g., add/increase anger expression). The face of edited frame 505 is angrier than the face of input frame 500. The lip in edited frame 505 is wider than the lip in input frame 500. That is, the lip is open to a relatively larger degree as a result of the increased anger expression. Machine learning model 225 can edit the portrait video while preserving the original identity of the face. With expression dynamics optimization, modified frame 510 follows closely the original motion of the lips while preserving the edited expression. In modified frame 510, the face looks angrier and the lip follows closely the original motion of the lip in input frame 500. In some examples, videos are in 4K resolution.

In some examples, the temporal profiles are visualized to analyze the lip motions. Without expression dynamics optimization, the mouth in edited frame 505 is not closing when the mouth in the original frame is closing. After optimization, the lip motions in modified frame 510 are more similar to the original (i.e., input frame 500). In some cases, the corner of the mouth is slightly adjusted (e.g., elevated) from the original to follow the editing intent.

Figure 6:
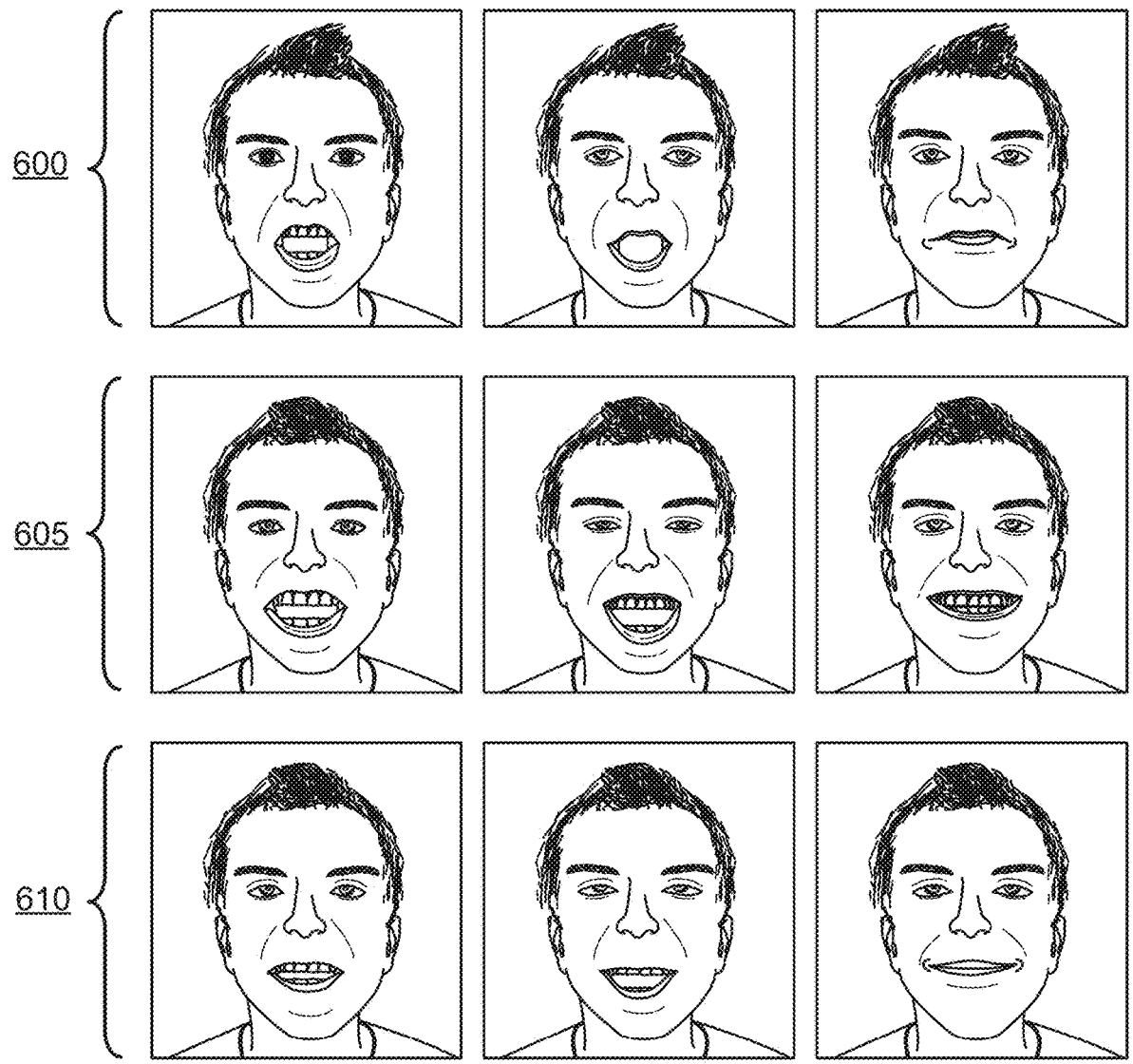
FIG. 6 shows an example of a sequence of expression dynamics according to aspects of the present disclosure.

FIG. 6 shows an example of a sequence of expression dynamics according to aspects of the present disclosure. The sequence of expression dynamics can be performed or executed using the video processing apparatus as shown in FIGS. 1 and 2. The example shown includes input frames 600, edited frames 605, and modified frames 610. Unlike images, videos have much more diversity including unusual poses, expressions, and motion blur. Machine learning model 225 takes natural expression dynamics into account when editing the expression. As an example shown in FIG. 6, input frames 600 includes three frames of a face. A user changes the smile attribute of the face such that the face of edited frames 605 shows increased smile. By changing the smile attribute, lips of edited frames 605 have opened to a larger degree and look wide open. By applying expression dynamic optimization, lips of modified frames 610 have opened to a lesser degree compared to edited frames 605. That is, the lips of modified frames 610 closely follow the original motion of lips in input frames 600.

Figure 7:
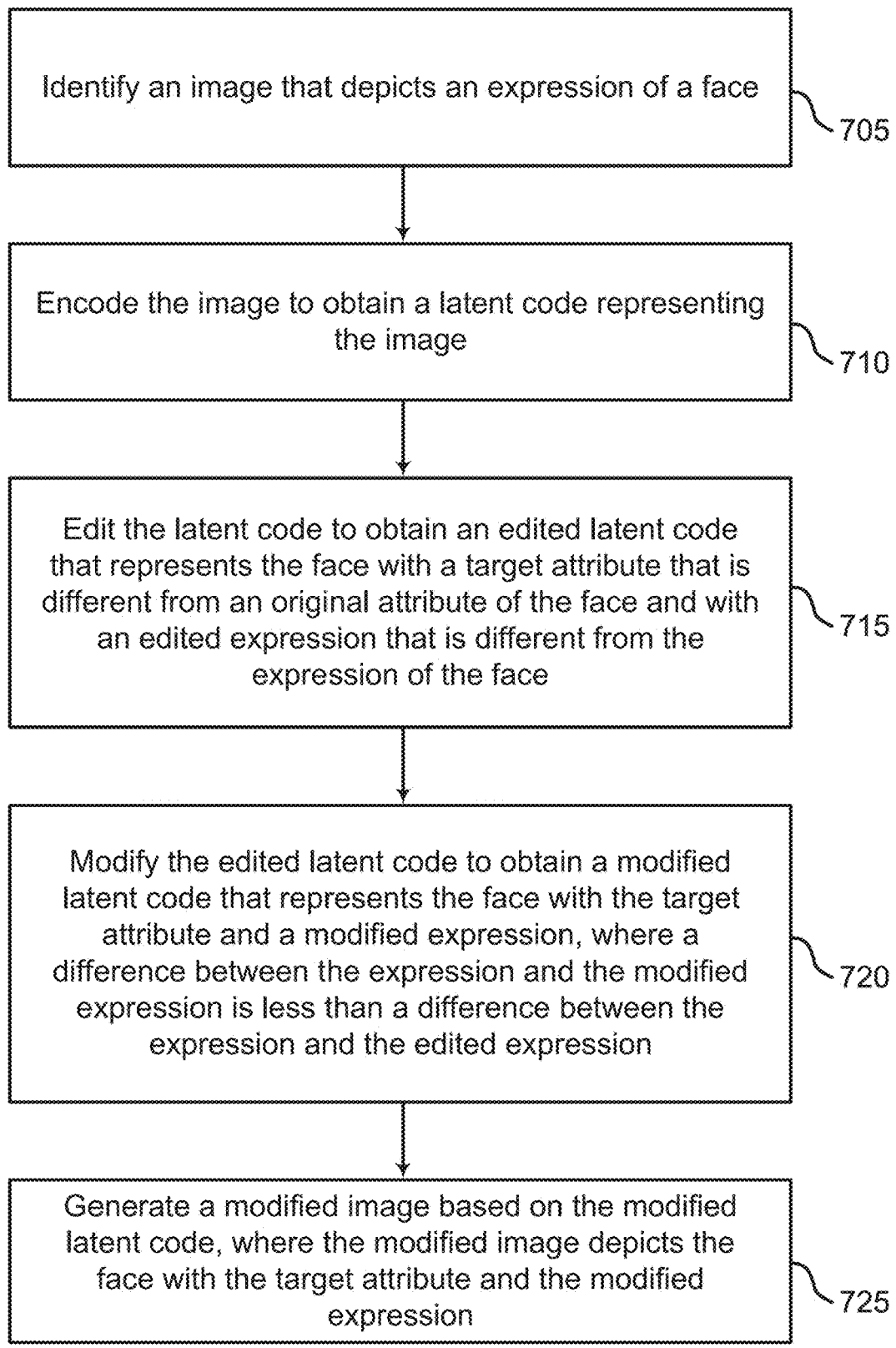
FIG. 7 shows an example of a method for video processing according to aspects of the present disclosure.

FIG. 7 shows an example of a method for video processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system identifies an image that depicts an expression of a face. In some cases, the operations of this step refer to, or may be performed by, a machine learning model as described with reference to FIG. 2. In some examples, an input full-frame video is input to a pre-processing component. The pre-processing component is configured to extract frames of the input video and crop the extracted frames to obtain cropped frames depicting a face. The cropped frames include the image. In an embodiment, machine learning model 225 aligns and crops the input video using the alignment method associated with the FFHQ dataset. In some examples, expressions of a face include, but not limited to, smile, anger, happiness, etc.

At operation 710, the system encodes the image to obtain a latent code representing the image. In some cases, the operations of this step refer to, or may be performed by, an image encoder as described with reference to FIGS. 2, 3, and 10. In some embodiments, the cropped frames are projected into the latent space of StyleGAN. Machine learning model 225 projects the image to the latent space of a pre-trained StyleGAN. Users, via an image editing component, can manipulate its high-level facial attributes by navigating the StyleGAN's latent space.

At operation 715, the system edits the latent code to obtain an edited latent code that represents the face with a target attribute that is different from an original attribute of the face and with an edited expression that is different from the expression of the face. In some cases, the operations of this step refer to, or may be performed by, an image editing component as described with reference to FIG. 2. In some examples, edits made to facial attributes include, but not limited to, age or de-age, add or remove makeup, exaggerate or suppress smile, increase or decrease happiness, increase anger or reduce anger, etc.

At operation 720, the system modifies the edited latent code to obtain a modified latent code that represents the face with the target attribute and a modified expression, where a difference between the expression and the modified expression is less than a difference between the expression and the edited expression. In some cases, the operations of this step refer to, or may be performed by, an expression dynamics optimization component as described with reference to FIGS. 2 and 3. According to some embodiments, the edited latent code is optimized to follow the natural expression dynamics of the original video while preserving the semantic changes. In some examples, the target attribute is the desired facial attribute (e.g., add or decrease smile expression of a face from the image). The modified expression is generated by altering the edited expression to preserve consistencies in motion blur or facial expression dynamics (e.g., around the eyes or lips) between the frames.

At operation 725, the system generates a modified image based on the modified latent code, where the modified image depicts the face with the target attribute and the modified expression. In some cases, the operations of this step refer to, or may be performed by, an image generator as described with reference to FIGS. 2, 3, 10, and 11. The modified frames comprising the modified image are composed back to the original full-frame video.

Figure 8:
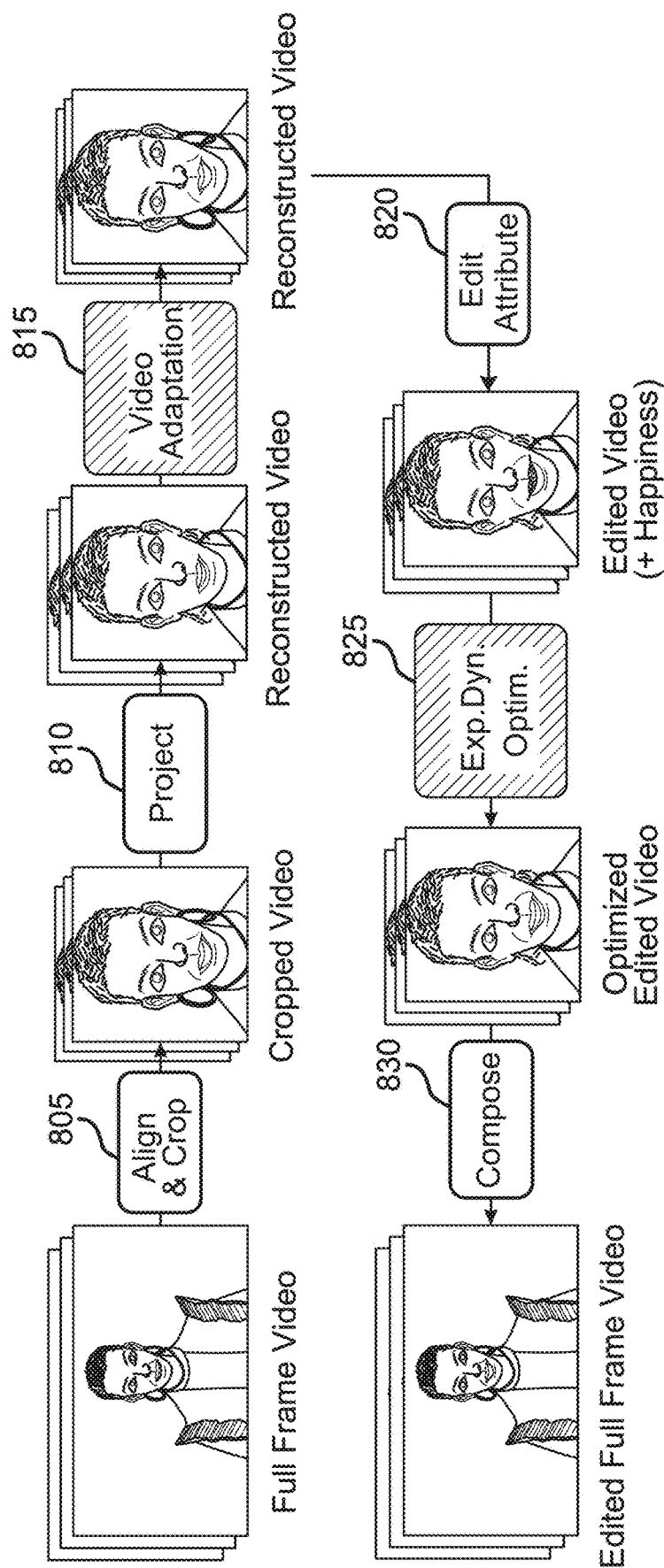
FIG. 8 shows an example of a method of video editing according to aspects of the present disclosure.

FIG. 8 shows an example of a method of video editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system aligns and crop a full frame video to obtain a cropped video. In some cases, the operations of this step refer to, or may be performed by, a pre-processing component as described with reference to FIGS. 2 and 3. A full frame video is input to a pre-processing component. The pre-processing component aligns the video and crops frames of the video using the method of FFHQ dataset.

In some embodiments, to perform attribute editing in the StyleGAN's latent space, the pre-processing component crops and aligns the portrait video. In some cases, StyleGAN is trained on an aligned face dataset and may not generate portrait images that deviate from the aligned space. A face landmark detection method is used to extract the landmark for frames of a video. The detected landmark trajectory is smoothed using optical flow and a Gaussian filtering because the face landmark detection method may not consider temporal information. The processed landmarks are used to align the frames such that the eyes are centered, and the frames are resized to 1024×1024 pixels.

At operation 810, the system projects the cropped video to obtain a reconstructed video. In some cases, the operations of this step refer to, or may be performed by, a pre-processing component as described with reference to FIGS. 2 and 3. An image encoder projects the cropped video into a latent space of StyleGAN. The image encoder is pre-trained. The image generator is fine-tuned using video adaptation methods described in this specification so that the image generator fits to the target input video.

At operation 815, the system performs video adaptation. In some cases, the operations of this step refer to, or may be performed by, an image editing component as described with reference to FIG. 2.

At operation 820, the system edits an attribute of the reconstructed video to obtain an edited video. In some cases, the operations of this step refer to, or may be performed by, an image editing component as described with reference to FIG. 2. To edit the original video, the image editing component linearly combines the latent codes with a known latent direction.

At operation 825, the system performs expression dynamics optimization to obtain an optimized edited video. In some cases, the operations of this step refer to, or may be performed by, an expression dynamics optimization component as described with reference to FIGS. 2 and 3. According to an embodiment, the expression dynamics optimization component optimizes the edited latent codes for natural expression dynamics of the original video. The optimized codes and the adapted image generator (e.g., StyleGAN) are used to generate a modified image (e.g., a desired edited portrait video). The modified image depicts the face with the target attribute and the modified expression.

At operation 830, the system composes the optimized edited video to obtain an edited full frame video. In some cases, the operations of this step refer to, or may be performed by, a composition component as described with reference to FIGS. 2 and 3. The modified image is composed back to the original full frame video.

After the editing is completed, the composition component applies the same parameters used in the alignment step to compose the edited portrait video back to the original full frame video. The face region extracted from a face segmentation network trained on a large-scale face image dataset (e.g., CelebAMask-HQ dataset) is used for composing.

Training and Evaluation

In FIGS. 9-12, a method, apparatus, and non-transitory computer readable medium for video processing are described. One or more embodiments of the method, apparatus, and non-transitory computer readable medium include training an image generator to generate facial images based on input from a latent space; encoding an image depicting an expression of a face to obtain a latent code representing the image in the latent space; generating a reconstructed image based on the latent code using the image generator; updating parameters of the image generator based on the reconstructed image to obtain an adapted image generator; editing the latent code to obtain an edited latent code that represents the face with a target attribute that is different from an original attribute of the face and with an edited expression that is different from the expression of the face; modifying the edited latent code to obtain a modified latent code that represents the face with the target attribute and a modified expression, wherein a difference between the expression and the modified expression is less than a difference between the expression and the edited expression; and generating a modified image based on the modified latent code using the adapted image generator, wherein the modified image depicts the face with the target attribute and the modified expression.

Some examples of the method, apparatus, and non-transitory computer readable medium further include computing a perceptual loss between the reconstructed image and the image, wherein the parameters of the image generator are updated based on the perceptual loss.

Some examples of the method, apparatus, and non-transitory computer readable medium further include computing a distance loss between the reconstructed image and the image, wherein the parameters of the image generator are updated based on the distance loss.

Figure 9:
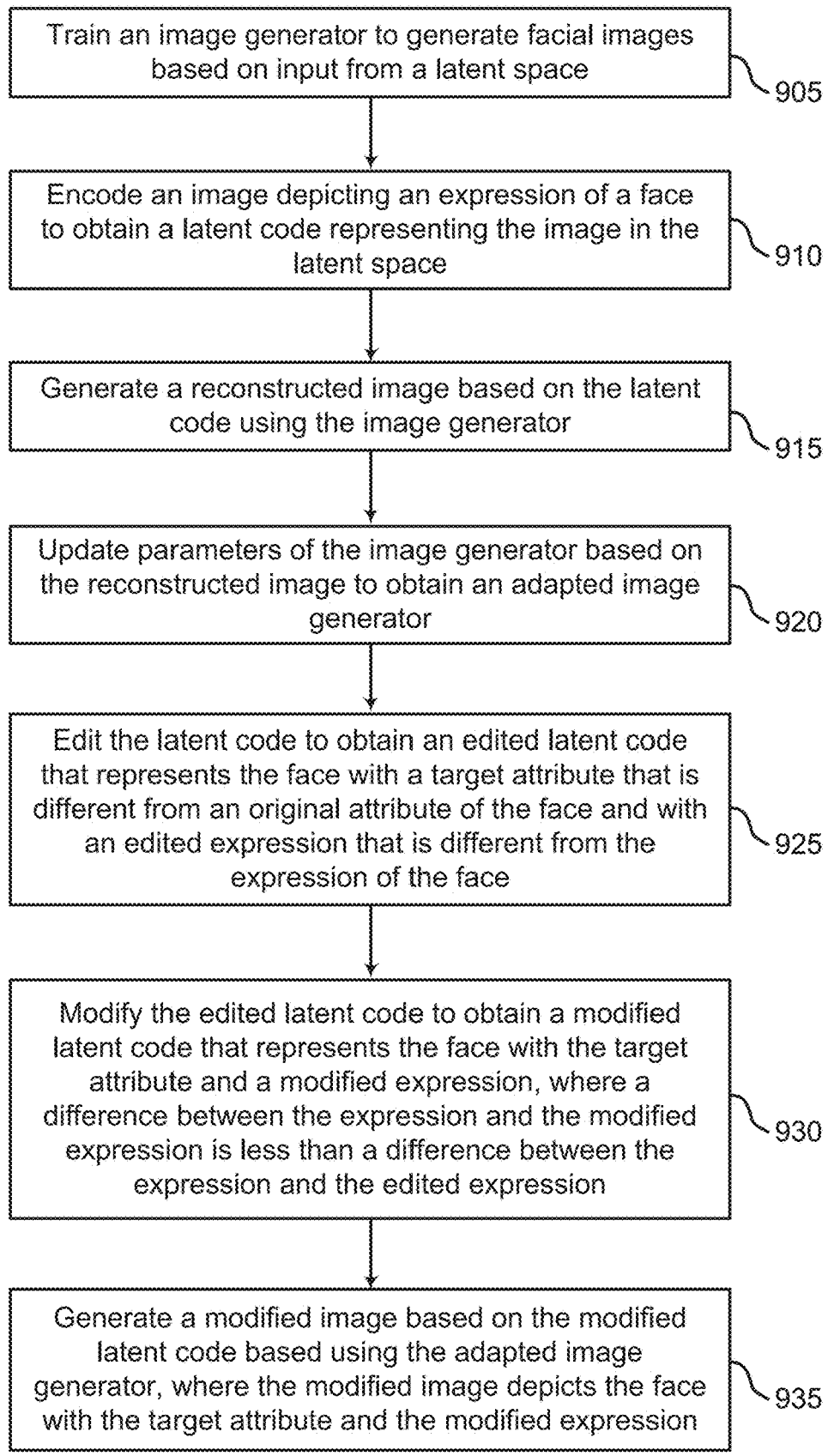
FIG. 9 shows an example of a method for training a machine learning model according to aspects of the present disclosure.

FIG. 9 shows an example of a method for training a machine learning model according to aspects of the present disclosure. Training component 220 as described with reference to FIG. 2 is used to train the machine learning model. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, machine learning model 225 is trained using supervised learning. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 905, the system trains an image generator to generate facial images based on input from a latent space. In some cases, the operations of this step refer to, or may be performed by, a training component as described with reference to FIG. 2.

At operation 910, the system encodes an image depicting an expression of a face to obtain a latent code representing the image in the latent space. In some cases, the operations of this step refer to, or may be performed by, an image encoder as described with reference to FIGS. 2, 3, and 10.

At operation 915, the system generates a reconstructed image based on the latent code using the image generator. In some cases, the operations of this step refer to, or may be performed by, an image generator as described with reference to FIGS. 2, 3, 10, and 11.

At operation 920, the system updates parameters of the image generator based on the reconstructed image to obtain an adapted image generator. In some cases, the operations of this step refer to, or may be performed by, a training component as described with reference to FIG. 2.

Some examples of the method, apparatus, and non-transitory computer readable medium further include generating a reconstructed image based on the latent code using an image generator. Some examples further include computing a perceptual loss between the reconstructed image and the image. Some examples further include updating parameters of the image generator based on the perceptual loss, wherein the modified image is generated using the updated parameters of the image generator.

Some examples of the method, apparatus, and non-transitory computer readable medium further include generating a reconstructed image based on the latent code using an image generator. Some examples further include computing a distance loss between the reconstructed image and the image. Some examples further include updating parameters of the image generator based on the distance loss, wherein the modified image is generated using the updated parameters of the image generator. Detail with regards to updating parameters of the image generator will be described in FIG. 10.

At operation 925, the system edits the latent code to obtain an edited latent code that represents the face with a target attribute that is different from an original attribute of the face and with an edited expression that is different from the expression of the face. In some cases, the operations of this step refer to, or may be performed by, an image editing component as described with reference to FIG. 2.

At operation 930, the system modifies the edited latent code to obtain a modified latent code that represents the face with the target attribute and a modified expression, where a difference between the expression and the modified expression is less than a difference between the expression and the edited expression. In some cases, the operations of this step refer to, or may be performed by, an expression dynamics optimization component as described with reference to FIGS. 2 and 3. According to some embodiments, latent codes are optimized to produce a modified video comprising a set of modified images that closely follows the original expression dynamics. Optimization objectives tailored for lips and eyes will be described in FIGS. 11 and 12. Detail regarding modifying the edited latent code based on regularization loss, temporal loss, landmark loss, and mask perceptual loss will be described in FIG. 11.

At operation 935, the system generates a modified image based on the modified latent code using the adapted image generator, where the modified image depicts the face with the target attribute and the modified expression. In some cases, the operations of this step refer to, or may be performed by, an image generator as described with reference to FIGS. 2, 3, 10, and 11.

Some embodiments of the present disclosure include systems and methods for portrait video editing using a pre-trained StyleGAN. Machine learning model 225, via video adaptation, can accurately invert the faces in video frames with unusual poses, expressions, and motion blur. Machine learning model 225 performs optimization for natural expression dynamics for editing the expression state of a video with fast motion of faces (e.g., a talking head video). The edited results can be composed back to the original 4 k resolution videos while maintaining quality of the video.

Figure 10:
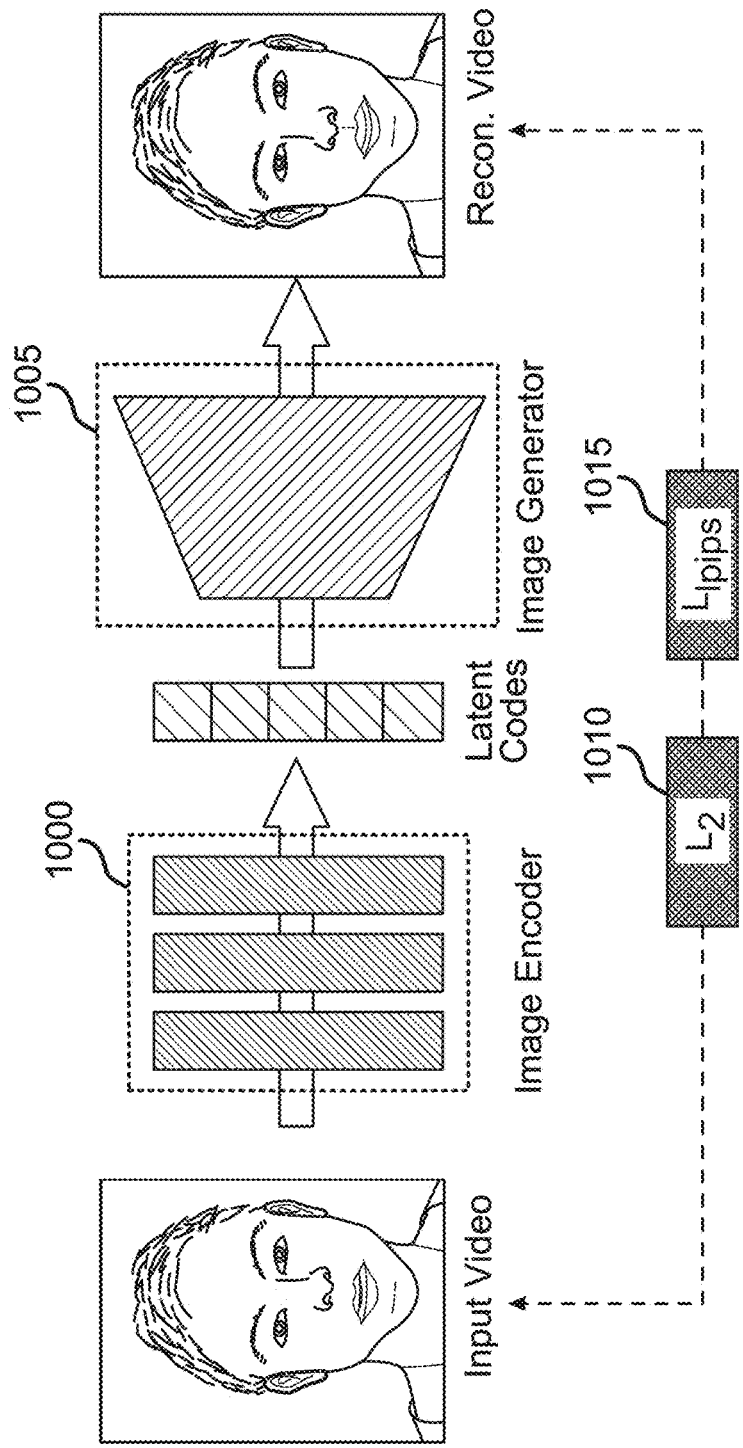
FIG. 10 shows an example of video adaptation according to aspects of the present disclosure.

FIG. 10 shows an example of video adaptation according to aspects of the present disclosure. The example shown includes image encoder 1000, image generator 1005, distance loss 1010, and perceptual loss 1015. Image encoder 1000 is an example of, or includes aspects of, the corresponding element described with reference to FIGS. 2 and 3.

In some cases, $\hat{V}$ and V may be different in terms of expressions and the identity of an object (e.g., a face). Image generator 1005 is denoted as G. Image generator 1005 or G is fine-tuned such that the reconstructed video frames P are almost identical to V. Domain adaptation methods are used for video adaptation. According to an embodiment, given V and W={$w^f$|f=1, . . . , N} as anchor points, G's network parameter θ is updated using the following loss terms:

$$\mathcal{L}_{va} = \lambda_{lpips} \mathcal{L}_{LPIPS}(I^f, G(w^f; \theta^*)) + \lambda_{L2} \mathcal{L}_{L2}(I^f, G(w^f; \theta^*)) \quad (2)$$

where $\mathcal{L}_{LPIPS}$ measures the perceptual distance between two images, $\mathcal{L}_{L2}$ computes the $L_2$ distance between two images, and θ* is the finetuned parameters of G. In some cases, $\mathcal{L}_{LPIPS}$ is referred to as a perceptual loss while $\mathcal{L}_{L2}$ is referred to as a distance loss.

The original video can be edited using StyleGAN editing operations after image generator 1005 is adapted to the target video. Video adaptation does not change the behavior of the latent space. Analysis on the video adaptation process and the editability of the fine-tuned latent space after video adaptation is described below. Image generator 1005 is an example of, or includes aspects of, the corresponding element described with reference to FIGS. 2, 3, and 11.

In some examples, image generator 1005 or G is fine-tuned using Adam optimizer with a learning rate of 1e⁻³. Both $\lambda_{lpips}$ and $\lambda_{L2}$ are set to 1. Image generator 1005 is tuned for approximately two minutes performing 1,000 iterations on a single NVIDIA Tesla V100 GPU.

Figure 11:
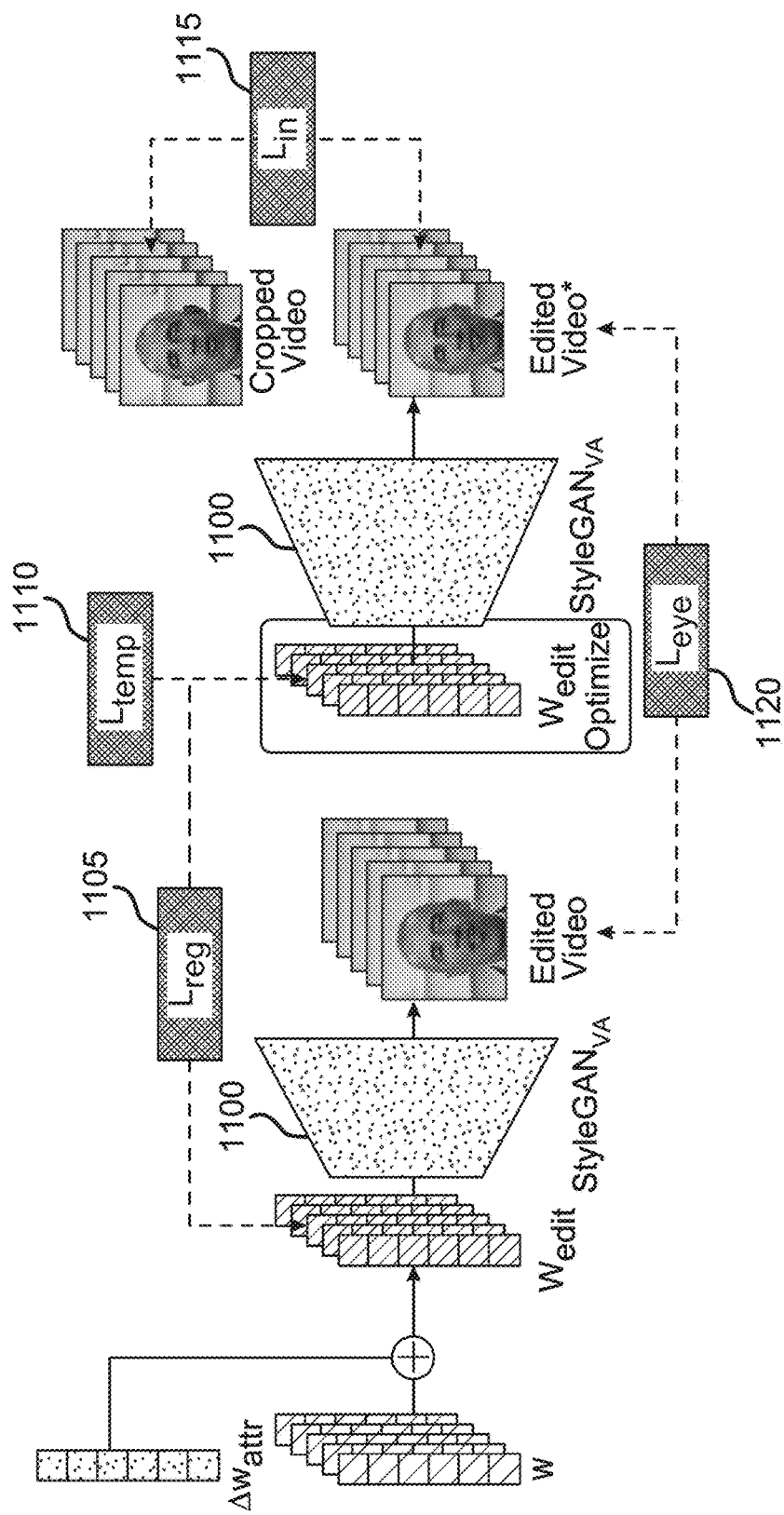
FIG. 11 shows an example of an expression dynamics optimization model according to aspects of the present disclosure.

FIG. 11 shows an example of an expression dynamics optimization model according to aspects of the present disclosure. Training component 220 as described with reference to FIG. 2 is used to train the expression dynamics optimization model. The example shown includes image generator 1100, regularization loss 1105, temporal loss 1110, landmark loss 1115, and mask perceptual loss 1120.

Some examples of the method, apparatus, and non-transitory computer readable medium further include identifying a facial landmark of the image corresponding to an element of the face. Some examples further include generating an edited image based on the edited latent code. Some examples further include identifying an edited facial landmark based on the edited image, wherein the edited facial landmark corresponds to the element of the face. Some examples further include computing a landmark loss based on the facial landmark and the edited facial landmark, wherein the landmark loss corresponds to the element of the face. Some examples further include updating the edited latent code based on the landmark loss to obtain the modified latent code. In some examples, the element of the face comprises a lip.

Some examples of the method, apparatus, and non-transitory computer readable medium further include generating a mask corresponding to an element of the face. Some examples further include generating an edited image based on the edited latent code. Some examples further include computing a mask perceptual loss based on the edited image and the mask, wherein the edited latent code is updated based on the mask perceptual loss. In some examples, the element of the face comprises an eye.

Some examples of the method, apparatus, and non-transitory computer readable medium further include computing a regularization loss based on the edited latent code and the modified latent code, wherein the edited latent code is modified based on the regularization loss.

Some examples of the method, apparatus, and non-transitory computer readable medium further include identifying an additional image, wherein the image and the additional image are from a same video. Some examples further include generating an additional modified latent code based on the additional image. Some examples further include computing a temporal loss based on the modified latent code and the additional modified latent code, wherein the edited latent code is modified based on the temporal loss.

In some cases, the individual latent codes are optimized to produce a modified video that closely follows the original expression dynamics. A number of facial expressions relate to the movements of lips and eyes. Accordingly, optimization objectives for lips and eyes are implemented. Landmark loss 1115, $\mathcal{L}_{lip}$, constrains the inner points of the lips to be similar to the original video. That is, landmark loss 1115 or $\mathcal{L}_{lip}$ is used to preserve the original mouth motion of a talking video after editing. $\mathcal{L}_{lip}$ is formulated as the following:

$$\mathcal{L}_{lip} = \sum_i \|\phi_i(I) - \phi_i(G(w_{edit} + \Delta w_{opt}; \theta^*))\|_2 \quad (3)$$

where φ is a pre-trained landmark detection network, i is the index of the inner lip landmarks, and $\Delta w_{opt}$ is the latent direction to be optimized.

According to an embodiment, mask perceptual loss 1120 is used for eyes due to the importance of eyes in conveying meanings and emotions. Mask perceptual loss 1120 measures the emotions conveyed by the eyes and the shape of the eyes. Mask perceptual loss 1120 or $\mathcal{L}_{eye}$ is used to keep the eye shape in the edited face. $\mathcal{L}_{eye}$ is a perceptual loss computed on the facial region around eyes. In some cases, methods such as face parsing may be used to obtain the eye region. $\mathcal{L}_{eye}$ is formulated as follows:

$$\mathcal{L}_{eye} = \mathcal{L}_{LPIPS}(I_{edit} \odot M_{eye}, G(w_{edit} + \Delta w_{opt}; \theta^*) \odot M_{eye}) \quad (4)$$

where $M_{eye}$ denotes a predefined eye mask, and ⊙ indicates element-wise multiplication.

Regularization loss 1105 is used to stabilize the optimization. The value of $\Delta w_{opt}$ is enforced to be as small as possible to ensure that the optimized latent codes do not have a large deviation from the original edited latent codes:

$$\mathcal{L}_{reg} = \|\Delta w_{opt}\|_2 \quad (5)$$

Additionally, temporal loss 1110 is used to preserve temporal smoothness of the latent codes. Temporal loss 1110 or $\mathcal{L}_{temp}$ enforces $\Delta w_{opt}$ to not change abruptly from one frame to a subsequent frame. $\mathcal{L}_{temp}$ is formulated as follows:

$$\mathcal{L}_{temp} = \sum_{f}^{N-1} \|\Delta w_{opt}^2 - \Delta w_{opt}^{f+1}\|_2 \quad (6)$$

where f indicates the frame index.

The final optimization is formulated as follows:

$$\arg\min_{\Delta w_{opt}} \lambda_{lip}\mathcal{L}_{lip} + \lambda_{eye}\mathcal{L}_{eye} + \lambda_{reg}\mathcal{L}_{reg} + \lambda_{temp}\mathcal{L}_{temp} \quad (7)$$

In some examples, Adam optimizer is used with a learning rate of $3e^{-4}$ for 200 iterations for a video with 48 frames. $\lambda_{lip}, \lambda_{eye}, \lambda_{reg}, \lambda_{temp}$ are set to 5000, 0.5, 8000, 5000, respectively. Optimization is performed in about 10 minutes on eight NVIDIA Tesla V100 GPUs.

Image generator 1100 is an example of, or includes aspects of, the corresponding element described with reference to FIGS. 2, 3, and 10. Landmark loss 1115 is an example of, or includes aspects of, the corresponding element described with reference to FIG. 12. Mask perceptual loss 1120 is an example of, or includes aspects of, the corresponding element described with reference to FIG. 12.

As described above, $\mathcal{L}_{eye}$ may be referred to as mask perceptual loss, and $\mathcal{L}_{lip}$ may be referred to as a landmark loss. For example, two different variations are compared to the optimization equation to show the effectiveness of the formulation. The first variation uses perceptual loss for both $\mathcal{L}_{eye}$ and $\mathcal{L}_{lip}$. The second variation uses landmark loss for both $\mathcal{L}_{eye}$ and $\mathcal{L}_{lip}$. In some examples, using perceptual loss for $\mathcal{L}_{lip}$ cannot preserve the lip contact. Some example experiments demonstrate that landmark loss is effective in preserving the position of the target landmark position. Perceptual loss is used for $\mathcal{L}_{eye}$ because face images generated from StyleGAN are well aligned to a fixed coordinate position.

Figure 12:
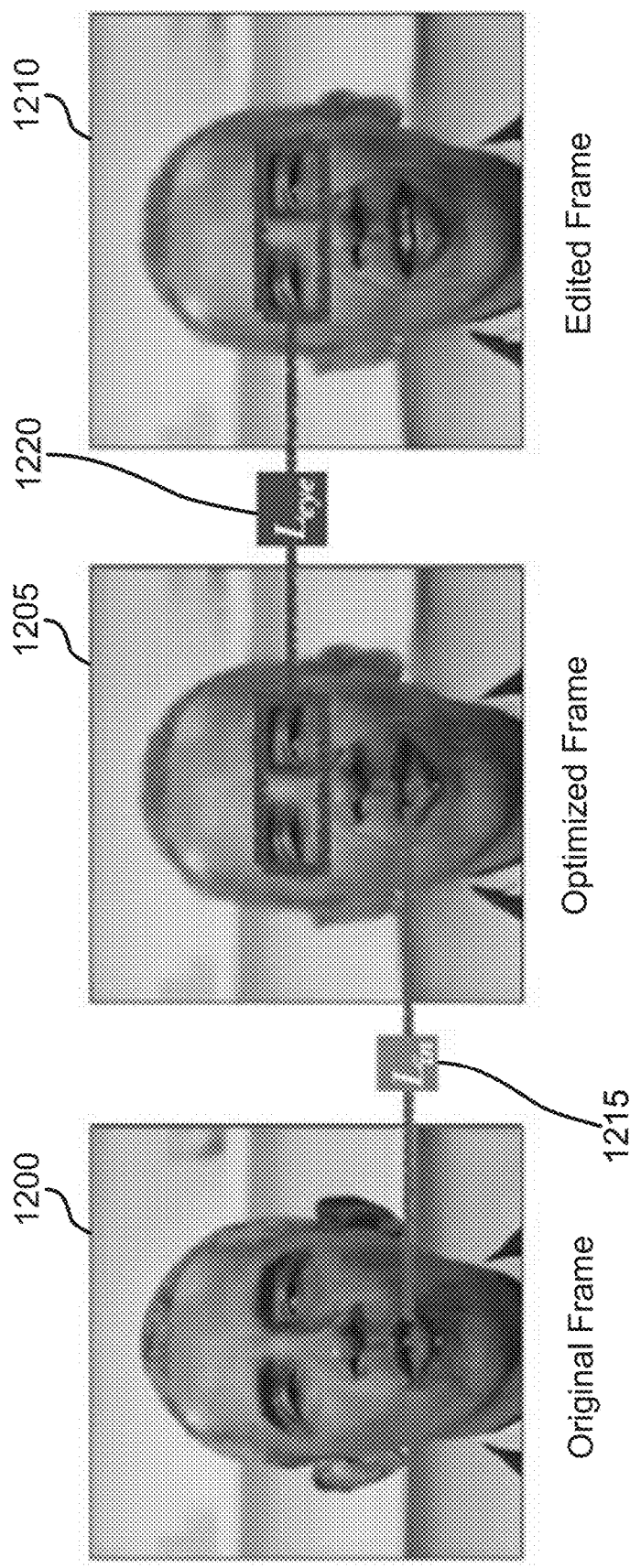
FIG. 12 shows an example of a landmark loss and a mask perceptual loss according to aspects of the present disclosure.

FIG. 12 shows an example of a landmark loss and a mask perceptual loss according to aspects of the present disclosure. The example shown includes input frame 1200, optimized frame 1205, edited frame 1210, landmark loss 1215, and mask perceptual loss 1220.

In some examples, a user edits an attribute of the person of input frame 1200 to increase smile expression. Input frame 1200 is edited to obtain edited frame 1210, which shows the mouth of a person open. After expression dynamics optimization, the mouth of optimized frame 1205, via mask perceptual loss 1220 and landmark loss 1215, follows the original expression while maintaining the edited expression. The eyes, corners, and the degree to which the lips are open indicate optimized frame 1205 preserves the original identity of the face. Expression dynamics optimization ensures optimized frame 1205 to follow closely the original motion of the lips while preserving the edited expression.

Input frame 1200 is an example of, or includes aspects of, the corresponding element described with reference to FIG. 5. Landmark loss 1215 is an example of, or includes aspects of, the corresponding element described with reference to FIG. 11. Mask perceptual loss 1220 is an example of, or includes aspects of, the corresponding element described with reference to FIG. 11.

Performance of apparatus, systems and methods of the present disclosure have been evaluated, and results indicate embodiments of the present disclosure have obtained increased performance over existing technology. Example experiments demonstrate that video processing apparatus 200 outperforms conventional systems.

Example experiments and evaluation indicate that machine learning model 225, via video adaptation method described in this specification, can reconstruct original videos and support semantic edits. Additionally, machine learning model 225, via expression dynamics optimization, preserves the original expression dynamics after editing the original video.

Example experiments are carried out on videos from multiple sources such as FaceForensics++, RAVDESS, Pexels, and YouTube. Videos from Pexels are cinematic and have high-resolution. The subjects in the videos are moving their heads slowly with minimal changes in expression. Subjects in the videos from RAVDESS, FaceForensics++, and YouTube are talking constantly where the expression dynamics optimization becomes important when editing. Some videos are used to validate that methods and systems described in the present disclosure can handle videos with motion blur.

Video processing apparatus 200 as shown in FIG. 2 can edit high-resolution portrait video from Pexels. While Style-GAN generates 1024×1024 resolution faces, the edited face can be up-sampled as needed and composed back to the original video without perceived loss of details. Video processing apparatus 200 outputs temporally coherent results through video adaptation and expression dynamics optimization.

Some example experiments evaluate the video adaptation methods of the present disclosure on videos with motion blur. Video processing apparatus 200, via the video adaptation method, can reconstruct the input frames with motion blur. After video adaptation, video processing apparatus 200 performs attribute editing on these videos with motion blur.

In some example experiments, two GAN inversion methods, i.e., R+Opt. and e4e are analyzed. R+Opt. recurrently uses the latent code of the previous frame to initialize that of the current frame for optimization. The optimized sequence of latent codes is expected to follow a smooth trajectory. The optimized latent code is in $\mathcal{W} \in \mathbb{R}^{1 \times 512}$. e4e is an image encoder. The resulting latent codes from e4e are in $\mathcal{W}^+ \in \mathbb{R}^{18 \times 512}$.

The latent codes for a given video are obtained using these methods. Then, principal component analysis (PCA) is used to reduce the dimension and project the latent codes into 2-D space by using the first two components of PCA. The latent trajectory from R+Opt. is smoother than the latent trajectory from e4e. However, the frames with similar expressions are not projected to the same location in the latent space. For example, frame 1 and frame 133 are similar in terms of facial expression and head pose. However, the latent codes of R+Opt. are located far apart in the latent space. Latent codes for frame 1 and frame 133 are located in a similar position in the latent space for e4e.

Further analysis can be performed by grouping the latent codes using K-means clustering with k=7. Each frame is colored to the cluster they belong to. In case of R+Opt., the frames are clustered depending on the frame index which is undesirable because a portrait video may have repetitive frames that are to be clustered together. Frames from e4e with similar poses and expressions can be clustered together better than those from R+Opt.

Thus, R+Opt. is not able to project the latent codes with frames with similar pose, expression, and style. Additionally, R+Opt. produces more temporal artifacts than e4e does even after the video adaptation method is applied.

Some example experiments show that expression dynamics optimization enables the generated frames to follow the original frames' lip motion while maintaining the originally edited semantics. That is, in some examples, the degree that the lip is open is similar to the original. While the lip motion is similar to the original, the corners of the lips still follow the edited results. For happiness attribute editing, the corners of the lips point upward in the optimized frames but do not do so in the original neutral frames. Cheekbones are elevated with the mouth. For the surprise and anger attributes, lips are gathered to show their expressions. Eyes are conveying the correct intended emotions. Video processing apparatus 200 performs well when motion blur is present.

In some examples, multiple attributes are manipulated sequentially in the latent space of StyleGAN using video processing apparatus 200. After editing is done, video processing apparatus 200, via expression dynamics optimization, preserves the original expression dynamics of the video. In some examples, edited eye and eyebrow shapes are preserved after the optimization. Facial features are changed while preserving the dynamics of the original video.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for video processing, comprising:
identifying an image that depicts an expression of a face;
encoding the image to obtain a latent code representing the image;
editing the latent code by adding an edit vector corresponding to a target attribute to obtain an edited latent code in a same latent space as the latent code, wherein the edited latent code represents the face with the target attribute that is different from an original attribute of the face and with an edited expression that is different from the expression of the face;
modifying the edited latent code using a landmark loss corresponding to a facial landmark to obtain a modified latent code in the same latent space as the latent code and the edited latent code, wherein the modified latent code represents the face with the target attribute and with a modified expression that is different from the expression and the edited expression; and
generating a modified image based on the modified latent code, wherein the modified image depicts the face with the target attribute and the modified expression.

2. The method of claim 1, further comprising:
extracting a plurality of frames from a video that depicts changing the expression of the face, wherein the image corresponds to a frame of the plurality of frames; and
combining the modified image with a plurality of modified frames corresponding to other frames of the plurality of frames to obtain a modified video that depicts the face with the target attribute.

3. The method of claim 1, further comprising:
receiving an extended image depicting the face and one or more additional elements; and
cropping the extended image to obtain the image.

4. The method of claim 3, further comprising:
aligning the modified image with the extended image; and
combining the modified image with the extended image based on the alignment to obtain a modified extended image.

5. The method of claim 1, further comprising:
tuning an image generator based on the image to obtain an adapted image generator, wherein the modified image is generated using the adapted image generator.

6. The method of claim 5, further comprising:
generating a reconstructed image based on the latent code using the image generator; and
computing a perceptual loss and a distance loss between the reconstructed image and the image, wherein the image generator is tuned based on the perceptual loss and the distance loss.

7. The method of claim 1, further comprising:
identifying the facial landmark of the image corresponding to an element of the face;
generating an edited image based on the edited latent code;
identifying an edited facial landmark based on the edited image, wherein the edited facial landmark corresponds to the element of the face;
computing the landmark loss based on the facial landmark and the edited facial landmark, wherein the landmark loss corresponds to the element of the face; and
updating the edited latent code based on the landmark loss to obtain the modified latent code.

8. The method of claim 7, wherein:
the element of the face comprises a lip.

9. The method of claim 1, further comprising:
generating a mask corresponding to an element of the face;
generating an edited image based on the edited latent code; and
computing a mask perceptual loss based on the edited image and the mask, wherein the edited latent code is updated based on the mask perceptual loss.

10. The method of claim 9, wherein:
the element of the face comprises an eye.

11. The method of claim 1, wherein:
the modified image is generated using a machine learning model that is trained using a regularization loss that reduces a difference between the edited latent code and the modified latent code.

12. The method of claim 1, wherein:
the modified image is generated using a machine learning model that is trained using a temporal loss that reduces changes in a difference between the edited latent code and the modified latent code across frames of a video.

13. The method of claim 1, further comprising:
receiving an editing input from a user; and
identifying the target attribute based on the editing input.

14. The method of claim 13, further comprising:
providing a plurality of attribute sliders in a graphical user interface (GUI), wherein the plurality of attribute sliders corresponds to a plurality of attributes of the face, and wherein the editing input comprises a change to one of the plurality of attribute sliders.

15. A method for training a machine learning model, comprising:
training an image generator to generate facial images based on input from a latent space;
encoding an image depicting an expression of a face to obtain a latent code representing the image in the latent space;
generating a reconstructed image based on the latent code using the image generator;
updating parameters of the image generator based on the reconstructed image to obtain an adapted image generator;
editing the latent code by adding an edit vector corresponding to a target attribute to obtain an edited latent code in a same latent space as the latent code, wherein the edited latent code represents the face with the target attribute that is different from an original attribute of the face and with an edited expression that is different from the expression of the face;
modifying the edited latent code using a landmark loss corresponding to a facial landmark to obtain a modified latent code in the same latent space as the latent code and the edited latent code, wherein the modified latent code represents the face with the target attribute and with a modified expression that is different from the expression and the edited expression, wherein the modified latent code is different from the latent code and the edited latent code; and
generating a modified image based on the modified latent code using the adapted image generator, wherein the modified image depicts the face with the target attribute and the modified expression.

16. The method of claim 15, further comprising:
computing a perceptual loss between the reconstructed image and the image, wherein the parameters of the image generator are updated based on the perceptual loss.

17. The method of claim 15, further comprising:
computing a distance loss between the reconstructed image and the image, wherein the parameters of the image generator are updated based on the distance loss.

18. An apparatus for video processing, comprising:
at least one processor;
at least one memory including instructions executable by the at least one processor;
an image encoder configured to encode an image depicting an expression of a face to obtain a latent code representing the image;
an image editing component configured to edit the latent code by adding an edit vector corresponding to a target attribute to obtain an edited latent code in a same latent space as the latent code, wherein the edited latent code represents the face with the target attribute that is different from an original attribute of the face and with an edited expression that is different from the expression of the face;
an expression dynamics optimization component configured to modify the edited latent code using a landmark loss corresponding to a facial landmark to obtain a modified latent code in the same latent space as the latent code and the edited latent code, wherein the modified latent code represents the face with the target attribute and with a modified expression that is different from the expression and the edited expression; and
an image generator configured to generate a modified image based on the modified latent code, wherein the modified image depicts the face with the target attribute and the modified expression.

19. The apparatus of claim 18, further comprising:
a pre-processing component configured to extract frames of a video and crop the extracted frames to obtain cropped frames depicting the face.

20. The apparatus of claim 18, further comprising:
a composition component configured to combine the modified image with an original extended image to obtain a modified extended image, and to compose a plurality of modified extended images to obtain a modified video.

* * * * *